United States Patent

[11] 3,577,871

| [72] | Inventor | Anthony R. Engler |
| | | Houston, Tex. |
| [21] | Appl. No. | 783,806 |
| [22] | Filed | Dec. 16, 1968 |
| [45] | Patented | May 11, 1971 |
| [73] | Assignee | Douglass Industries, Inc. |
| | | Houston, Tex. |

[54] CHAIN CURTAIN
5 Claims, 3 Drawing Figs.

[52] U.S. Cl. ................................................ 56/25.4
[51] Int. Cl. ............................................. A01d 53/08
[50] Field of Search ........................... 56/25.4, 26, 29, 255

[56] References Cited
UNITED STATES PATENTS

| 2,531,732 | 11/1950 | Hoffman | 56/29 |
| 3,053,033 | 9/1962 | Maguire | 56/25.4 |
| 3,369,350 | 2/1968 | Rogers et al. | 56/25.4 |

*Primary Examiner*—Antonio F. Guida
*Attorneys*—Murray Robinson and Ned L. Conley ABSTRACT: Curtain attached to a mower comprising a plurality of chain elements hanging downwardly from the mower body. Cable means extend horizontally through links near the bottom of the chain elements to provide rigidity.

Patented May 11, 1971

3,577,871

Anthony R. Engler
INVENTOR.

BY Robert M. Burkeiser

ATTORNEY

CHAIN CURTAIN

BACKGROUND OF THE INVENTION

1. Field of the Invention

Mowers, especially those used to cut grass or weeds in large areas such as along highway rights-of-way, oftentimes encounter rough terrain having objects thereon such as rocks, chunks of wood or the like. When the cutting blade strikes them, they may be propelled outwardly with great force and cause damage to persons, animals or equipment nearby. Thus, it is desirable to restrain such foreign bodies so that they are not so propelled, or at least are substantially decelerated by the housing of the mower. This invention pertains to means for attaining such stoppage or deceleration. 2. Description of the Prior Art Numerous approaches have been made with a view toward reducing the damage caused by such propelled objects. One such approach has been the provision of chain members to the leading, trailing and/or side edges of the mower body. Generally these have included individual chain link elements depending from an edge of the housing. One example of such structure is shown in U.S. Pat. No. 3,369,350.

SUMMARY OF THE INVENTION

This invention's chain curtain includes a plurality of chain elements. A central link of each element may be affixed, as by welding, to an edge of the mower housing, forming two downwardly depending portions of each element. Cable means, or similar rigidifying material, is passed through one of the lowermost links of each element, said cable means being secured at intervals to certain of said chain elements. This adds a certain rigidity, and forms a chain curtain. When such chain elements are individually and separately hung, an object such as a rock may strike one centrally, cause it to yield and continue its flight substantially unabated. The added rigidity provided by the cable means more securely restrains such action and provides a somewhat yieldable cushion to absorb much of the force exerted by such a flying object.

DESCRIPTION OF A PREFERRED EMBODIMENT

Figure 1:
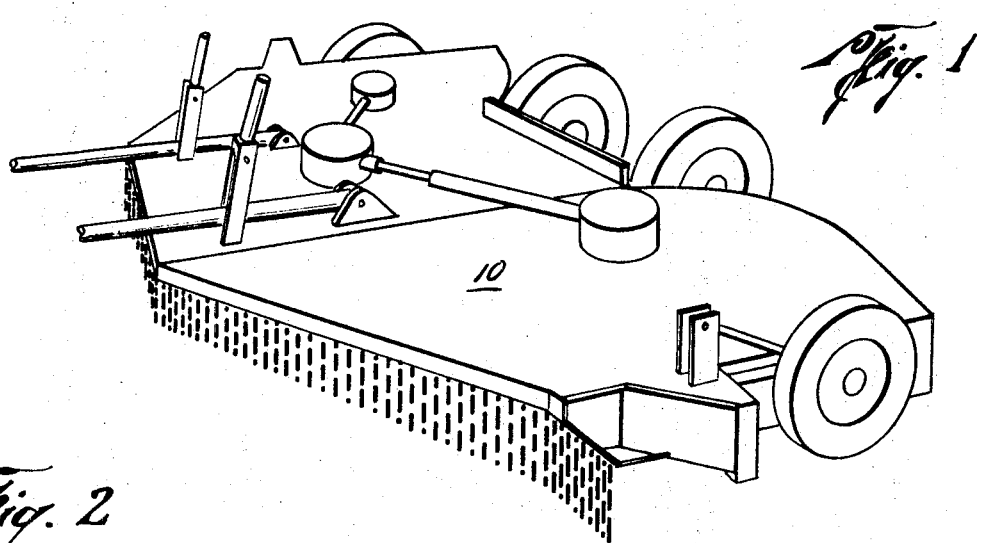
FIG. 1 is a perspective of a generalized mower showing the chain curtain somewhat schematically.

Guards, such as chain guards are oftentimes attached to the edges, leading, trailing or side, of mowers, such as that shown in U.S. Pat. No. 3,032,957. The housing of such a mower is illustrated generally at 10, a flange associated therewith at 11, and the lower edge of the flange at 12. A plurality of chain elements 20 are joined, such as by welding, or other appropriate means, to edge 12 of member 11 of the housing. Each chain element includes a number of chain links. In the embodiment shown, each element includes 9 links though the total number is not critical. The middle link 20a of each element is shown to be welded to the housing, with two strands, each strand having four links depending or hanging downwardly.

Toward the bottom of each chain element, cable means 30 are seen to pass through one link of each element. Cables are specified though relatively flexible rods might suffice. Also, the cable 30 is shown to pass through one link of each element rather than through one link of each strand, i.e., one strand may hang loosely interior of or exterior of cable 30. In some situations it may be preferable to pass the cable through one link of each strand when dual strands are used as shown in the drawing.

Figure 2:
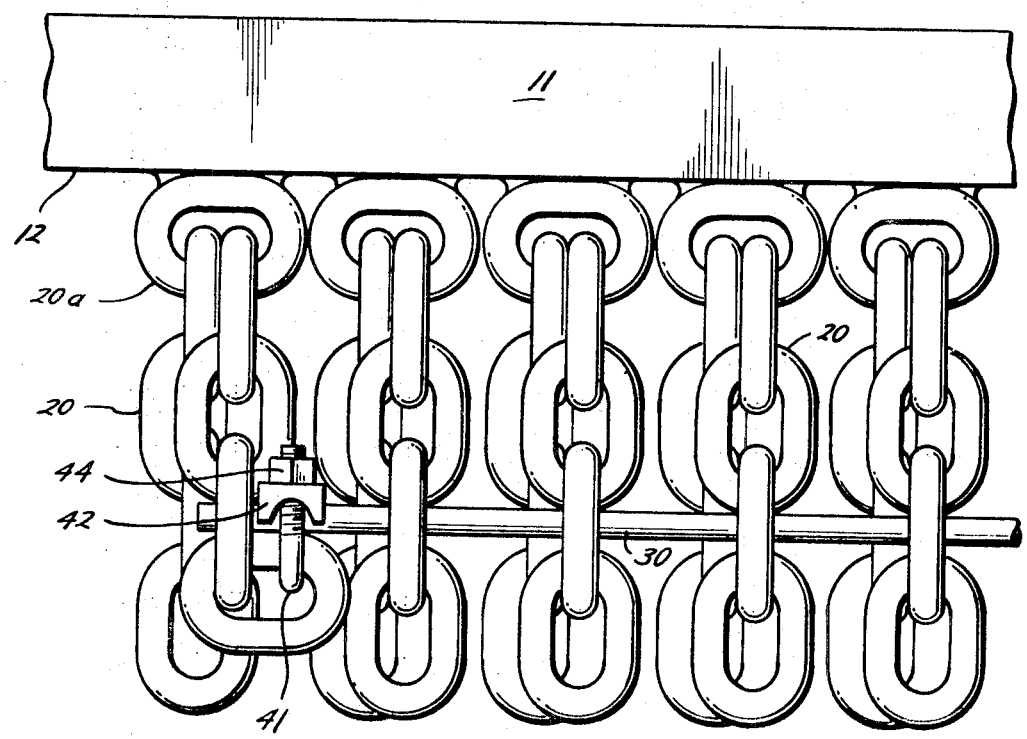
FIG. 2 is a partial front elevation of the chain curtain affixed to a mower housing.
Figure 3:
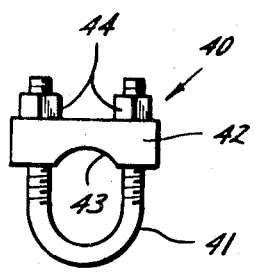
FIG. 3 is a side elevation of the clipping device.

Near each end of each cable length, only one such end being shown in FIG. 2, a chain link is affixed to the cable by means of a clip 40, such as a Crosby clip. Such attaching means may be that shown in FIG. 3. The bottom link of a chain segment is encompassed by U-shaped bolt 41 which has threaded ends. Said bolt ends pass through apertures in member 42, said member being arcuately cut away at 43 to accommodate cable 30. Nuts 44 may be tightened on the threaded bolt ends to tighten the grip of bolt 41 on the encompassed chain link and cable 30. This arrangement secures the cable means to the row of chain elements. The cable means should be affixed at or near the bottom of the chain elements to provide the desired curtain effect. Otherwise objects will pass thereunder in the manner permitted in the absence of the cable.

Obviously the chain curtain depicted may be utilized on cutting devices other than on strictly mowers, and may be positioned completely around the housing other than only at the front or trailing edge.

Although only a single embodiment of the invention has been depicted, it should be obvious that numerous modifications would be possible by one skilled in the art without departing from the spirit of the invention, the scope of which is limited only by the following appended claims.

I claim:

1. Guard for a cutting machine comprising:
   a plurality of chain elements affixed to the housing of said machine and extending downwardly therefrom, each element having a plurality of links; and
   rigidifying means comprising a member extending substantially around the periphery of said elements and passing through links of a plurality of said elements near the lower end of said elements.

2. The guard of claim 1 wherein said rigidifying means is a cable attached near its opposite ends to individual links of said chain elements.

3. The guard of claim 2 wherein said rigidifying means passes through individual links of substantially all of said chain elements.

4. The guard of claim 2 wherein said rigidifying means is attached to individual links of said chain elements by a U-shaped bolt encompassing said individual links and said rigidifying means.

5. The guard of claim 1 wherein said plurality of chain elements each comprises a pair of chain segments joined together by a connector link, said connector link being affixed to the housing of said cutting machine.